(12) United States Patent
Lunden et al.

(10) Patent No.: US 10,791,483 B2
(45) Date of Patent: Sep. 29, 2020

(54) APPARATUSES, METHODS AND COMPUTER PROGRAM PRODUCTS FOR IDENTIFYING HANDOVER FAILURE MODES

(71) Applicant: Nokia Technologies Oy, Espoo (FI)

(72) Inventors: Jari Petteri Lunden, Espoo (FI); Elena Virtej, Espoo (FI); Lars Dalsgaard, Oulu (FI); Esa Mikael Malkamaki, Espoo (FI); Ilkka Keskitalo, Oulu (FI); Jarkko Tuomo Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 133 days.

(21) Appl. No.: 15/037,219

(22) PCT Filed: Nov. 19, 2013

(86) PCT No.: PCT/IB2013/060254
§ 371 (c)(1),
(2) Date: May 17, 2016

(87) PCT Pub. No.: WO2015/075501
PCT Pub. Date: May 28, 2015

(65) Prior Publication Data
US 2016/0295462 A1   Oct. 6, 2016

(51) Int. Cl.
*H04W 36/30* (2009.01)
*H04W 36/00* (2009.01)
(Continued)

(52) U.S. Cl.
CPC ... *H04W 36/0005* (2013.01); *H04W 36/0055* (2013.01); *H04W 36/305* (2018.08);
(Continued)

(58) Field of Classification Search
CPC . H04W 24/10; H04W 36/0083; H04W 36/08; H04W 76/028; H04W 36/0055;
(Continued)

(56) References Cited

U.S. PATENT DOCUMENTS 9,326,213 B2  4/2016 Catovic et al.
2010/0325267 A1* 12/2010 Mishra ............ H04W 24/02
                                              709/224
(Continued)

FOREIGN PATENT DOCUMENTS

WO   2013050646 A2   4/2013
WO   2013167204 A1   11/2013

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.5.0, Sep. 2013, pp. 1-347.
(Continued)

*Primary Examiner* — Jae Y Lee
*Assistant Examiner* — Aixa A Guadalupe Cruz
(74) *Attorney, Agent, or Firm* — Mintz Levin Cohn Ferris Glovsky and Popeo, P.C.

(57) ABSTRACT

Handover failure modes are identified by logging information associated with at least one of a handover failure or a radio link failure. The information identifies whether or not a user equipment was engaged in an exchange of at least one of data traffic or control traffic with a network at the time that the handover failure or radio link failure occurred. The information is stored in a non-transitory computer-readable medium, and the information is reported to the network. The information is reported using a radio link failure or connection failure information signaling message. The severity of the handover failure or radio link failure is evaluated based upon the information.

13 Claims, 5 Drawing Sheets

(51) Int. Cl.
*H04W 76/19* (2018.01)
*H04W 76/28* (2018.01)
*H04W 88/02* (2009.01)
*H04W 88/08* (2009.01)

(52) U.S. Cl.
CPC ........... *H04W 76/19* (2018.02); *H04W 76/28* (2018.02); *H04W 36/0079* (2018.08); *H04W 88/02* (2013.01); *H04W 88/08* (2013.01)

(58) Field of Classification Search
CPC ......... H04W 36/0005; H04W 36/0022; H04W 36/0066; H04W 36/24; H04W 36/32; H04W 36/34; H04W 36/0016; H04W 36/0094
See application file for complete search history.

(56) References Cited

U.S. PATENT DOCUMENTS

| | | | |
|---|---|---|---|
| 2011/0183633 A1 | 7/2011 | Vera et al. | |
| 2012/0039167 A1* | 2/2012 | Swaminathan | H04W 76/16 370/225 |
| 2012/0202557 A1* | 8/2012 | Olofsson | H04W 24/08 455/525 |
| 2012/0257522 A1 | 10/2012 | Hiroyuki et al. | |
| 2013/0294307 A1* | 11/2013 | Johansson | H04W 52/0209 370/311 |
| 2015/0271868 A1* | 9/2015 | Rune | H04W 24/08 370/311 |
| 2017/0237531 A1* | 8/2017 | Futaki | H04L 5/001 370/338 |
| 2017/0303148 A1* | 10/2017 | Johansson | H04W 24/04 |

OTHER PUBLICATIONS

"New WI proposal: Hetnet Mobility Enhancements for LTE", 3GPP TSG-RAN meeting #58, RP-122007, Agenda: 13.1, Alcatel-Lucent, Dec. 4-7, 2012, 11 Pages.

Office action received for corresponding European Patent Application No. 13815834.0, dated Mar. 15, 2017, 7 pages.

International Search Report and Written Opinion received for corresponding Patent Cooperation Treaty Application No. PCT/IB2013/060254, dated Jul. 30, 2016, 11 pages.

\* cited by examiner

APPARATUSES, METHODS AND COMPUTER PROGRAM PRODUCTS FOR IDENTIFYING HANDOVER FAILURE MODES

RELATED APPLICATION

This application was originally filed as Patent Cooperation Treaty Application No. PCT/IB2013/060254 filed Nov. 19, 2013

TECHNICAL FIELD

This invention relates generally to wireless communications and, more specifically, to methods, apparatuses, and computer program products for identifying handover failure modes.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Various abbreviations that may appear in the description and drawings are defined as follows:
 3GPP: Third Generation Partnership Project
 ASIC: application-specific integrated circuit
 DL-SCH: downlink-shared channel
 DRX: discontinuous reception
 DSP: digital signal processor
 eNB: evolved Node B; base station
 E-UTRAN: evolved Universal Mobile Telecommunications System
 HARQ: hybrid automatic repeat request
 HeNB: home E-UTRAN NodeB base station
 HetNet: heterogeneous network
 HO: handover
 HOF: handover failure
 KPI: key performance indicator
 LTE: Long Term Evolution
 MeNB: Master eNB
 MIMO: multiple-input multiple-output
 MME: mobility management entity
 NW: network
 OFDM: orthogonal frequency division multiplexed
 PDCP: packet data convergence protocol
 PPI: power preference indication
 PRB: physical resource block
 QoS: quality of service
 RAT: radio access technology
 RF: radio frequency
 RFIC: radio frequency integrated circuit
 RLC: radio link control
 RLF: radio link failure
 RLM: radio link monitoring\
 RRH: remote radio head
 RSRP: reference signal receiving power
 RSRQ: reference signal received quality
 eNB: secondary cell eNB
 SeNB: secondary eNB
 S-GW: serving gateway
 SRB: signaling radio bearer
 TS: technical standard
 UE: user equipment
 UL: uplink
 UMTS: Universal Mobile Telecommunications System
 WI: working item Heterogeneous networks (HetNets) are an attractive means of expanding mobile network capacity. An HetNet may include multiple radio access technologies (RATs), architectures, transmission solutions, and base stations of varying transmitting power. HetNets may be able to improve system capacity and user throughput. Some HetNets include macro cells that are served by macro base stations, such as macro evolved Node Bs (eNBs), and smaller cells, such as pico cells, that may be served by base stations (pico eNBs), One issue with these HetNets is providing seamless connections and robust mobility for user equipments (UEs), particularly for UE transitions between macro cells and small cells. A small cell may be served by nodes using less transmitting power, such as remote radio head (RRH) nodes, pico eNBs, HeNBs, and relay nodes. The heterogeneous network may include one or more wireless access points, or base stations, such as an E-UTRAN (evolved Universal Mobile Telecommunications System) Terrestrial Radio Access Network NodeB base station serving macro cells, and one or more small cell base stations serving small cells. For example, a small cell base station or wireless access point or remote radio head may be implemented to cover a small cell or a small coverage area. Illustratively, the coverage area of a small cell may include a residence, a small business, a building, an office, or a small area. The small cell base station, such as a home base station (HNB), a home E-UTRAN NodeB base station (HeNB), a WiFi access point, or the like, may be configured to have some of the functionality found in a typical base station, such as an E-UTRAN NodeB (eNB) base station, but the small cell base station may have a smaller coverage area, less range, and lower power capabilities compared to the typical base station.

A small cell base station may have a limited (or non-ideal) backhaul connection that may have higher latency or lower throughput than would be the case for a macro cell base station. This limited backhaul connection may affect communication between small cell base stations and other base stations and other network elements or nodes. A UE may act as an access point or a base station for other devices (multiple devices, or part of device to device communication or group communication), so that in some cases a user equipment may be considered as a limited capability base station or small cell. For example, the small cell base station may be implemented as a femtocell wireless access point/base station having power sufficient for a cell serving wireless devices within a limited range of about tens of meters. Pico cell base stations are another example of a small cell base station, but pico cell base stations have somewhat greater range serving a small area on the order of about 100-200 meters. The small cell base station may be implemented as a secondary base station, for example, a secondary cell (SCell) eNB in carrier aggregation. The SCell eNB may also be called a secondary eNB (SeNB). Accordingly, wireless service providers view small cell base stations as a way to extend service coverage into a small cell, as a way to offload traffic to the small cell base stations, and/or as a way to provide enhanced service, such as higher data rates, lower latencies, energy efficiency and the like, within the small cell, when compared to the larger macro cell served by a typical base station, such as the eNB base station. The macro cell base station may be also implemented as a primary base station, for example, a primary cell (PCell) eNB in carrier aggregation and may also be called a master eNB (MeNB).

Even though illustrative embodiments of the invention are described in the context of macro cells (or MeNBs) and small cells (or SeNB)s, it should be understood that the invention may be applied in the context of other cell sizes, other types of cells, or other types of RATs. Alternatively or additionally, the invention may be applied at least in part to a UE's D2D connection as, for example, the UE's connection to the NW could be master and D2D connection would be the secondary or vice-versa.

The macro cell eNB may be in communication with the small cell eNB via an open interface, for example X2, Xn interface, or the like. This interface may be non-ideal, for example, having latency above 1 ms and even up to 60 ms or more, which may introduce significant delay in communication between macro cell eNB and small cell eNB. The macro cell eNB may be in connection with a core network, for example, a mobility management entity (MME) and a serving gateway (S-GW), via an S1 interface. In some other exemplary embodiments, the small cell eNB may be directly in connection with the core network.

In a co-channel HetNet deployment, a UE may suffer interference when it is located in the cell-edge district. Alternatively or additionally, the exemplary embodiments of the invention may be applied to other scenarios such as an inter-frequency type of deployment of a HetNet, where the macro cells and the small cells are deployed on different frequency layers. Alternatively or additionally, the exemplary embodiments of the invention may be applied to any of a variety of different RATs as long as the low quality of a radio link may be identified as "serious" or "less serious".

The reference signal receiving power (RSRP) from a pico cell varies more quickly compared with that from a macro cell. As a result, when a UE is moving towards or away from a pico cell, it may suffer a higher radio link failure (RLF) rate and/or a higher handover failure (HOF) rate before the UE hands over to a target cell. This is especially an issue for UEs that are moving at a medium or high speed (for example, traveling in a car). Frequent handover for medium or high speed UEs may result in an excessively large overhead for both eNBs and UEs.

Release 12 of the Third Generation Partnership Project (3GPP) includes a working item (WI) for HetNet (RP-122007). The HetNet WI is directed to enhancing mobility robustness and recovery from radio link failures in any of a variety of HetNet deployments. These deployments may encompass different cell sizes, possibly on multiple frequency layers. One observation from the studies so far is that many of the problems are caused, or made more severe, through the use of long discontinuous reception (DRX). These situations may arise when the UE is not engaged in active traffic and is thus using DRX opportunities fully and also measuring less frequently. Handover (HO) for the UE may be delayed because it takes longer to observe a change in current radio conditions, such as detecting new cells, determining the signal level and signal quality of a serving cell, and identifying the best neighboring cells. This delay may lead to HO failures or radio link failures.

Handover failure (HOF) and Radio link failure (RLF) are among the main key performance indicators (KPIs) of interest when assessing network performance. Network (NW) vendors strive to keep the number of HOFs and RLFs to a minimum. Pressure to keep these KPI's low may lead to conservative use of connected mode DRX, or perhaps even omitting the connected-mode DRX feature altogether.

On the other hand, use of DRX may be advantageous in terms of enabling UE power saving options when the UE is in connected mode with data transmissions that involve inactive periods. Likewise, connected mode DRX enables the network to optimize UE state transitions between an idle mode and a connected mode. The UE may be kept in connected mode for a longer period of time without sacrificing power consumption, thereby reducing or eliminating state transition signaling and state transition delays.

Radio link monitoring (RLM) and detecting and triggering of RLF is specified in 3GPP Technical Standard (TS) 36.331. The UE variable VarRLF-Report includes the RLF information or the HOF information. While minimizing the occurrence of HOFs and RLFs is generally desirable, taking this concept to the extreme is not always the best idea. Consider a situation where a failure takes place when the UE is not having an active data transmission session. This scenario is likely in the case of data transmissions comprised of data bursts, with inactive period of time occurring between the data bursts. Having a connection 'failure' during this inactive time when there is no actual data exchange between the UE and the NW is essentially unnoticeable to the user, but this failure is still counted negatively in the NW KPIs. Accordingly, developing solutions to reduce these types of failures does not improve the overall user experience. Further, the connection failures may be affected by transmission signal formats such as modulation and coding schemes, and/or antenna port information which may, for example, comprise what type of antenna configurations have been used at different sites, possible coordinated multipoint transmission (CoMP), or the like. Such information may be added in the failure reports in order to provide complementary information for performing root cause analysis of the handover of radio link failures.

SUMMARY

According to one embodiment, a method comprises logging information associated with at least one of a handover failure or a radio link failure, the information identifying whether or not a user equipment was engaged in an exchange of at least one of data traffic or control traffic with a network at the time that the handover failure or radio link failure occurred, storing the information in a non-transitory computer-readable medium, and reporting the information to the network. The information may be reported using a radio link failure or connection failure information signaling message. The exchanging of at least one of data traffic or control traffic means that data traffic may be exchanged without any exchange of control traffic, or control traffic may be exchanged without any exchange of data traffic, or both control and data traffic may be exchanged.

According to another embodiment, a method comprises receiving logging information associated with at least one of a handover failure or a radio link failure, the information identifying whether or not a user equipment was engaged in an exchange of at least one of data traffic or control traffic with a network at the time that the handover failure or radio link failure occurred, and in response to the received logging information, categorizing the handover failure or the radio link failure.

According to a further embodiment, the method comprises performing a grading or evaluation of the radio link failure, wherein the radio link failure is designated as a soft radio link failure in response to one or more of: a call re-establishment being successful, or the radio link failure occurring when there is no active exchange of at least one of data traffic or control traffic between the user equipment and the network. Thus, the soft radio link failure is used when the impact on user experience and/or the network is low or negligible. Alternatively or additionally, the user equipment may log or provide an indication as to whether or not there was an interruption during the exchange of at least one of data traffic or control traffic between the user equipment and the network, and/or how long the interruption was observed by the user equipment. The length of the interruption may be defined to be, for example, the time from when the UE has had pending data that cannot be served due to the failure (e.g. RLF or HOF, or starting of a T310 timer or starting of some other timer when the UE's link quality drops below a predetermined quality criterion) until re-establishment of the connection or establishment of a new connection. The length of the interruption may, for example, be conceptualized as an additional delay caused by the interruption because the UE cannot be scheduled as its connection has failed or the quality is low. These definitions of length of interruption are illustrative, as other definitions may be used as well. Alternatively or additionally, the log or indication may contain information regarding the duration of the interruption even if the user equipment had not been engaged in an exchange of data traffic or control traffic with the network.

According to another embodiment, an apparatus comprises one or more processors and one or more memories including computer program code, the one or more memories and the computer program code being configured, with the one or more processors, to cause the apparatus to perform at least logging information associated with at least one of a handover failure or a radio link failure, the information identifying whether or not a user equipment was engaged in an exchange of at least one of data traffic or control traffic with a network at the time that the handover failure or radio link failure occurred, storing the information in a non-transitory computer-readable medium, and reporting the information to the network. The information may be reported using a radio link failure or connection failure information signaling message.

According to another embodiment, an apparatus comprises one or more processors and one or more memories including computer program code, the one or more memories and the computer program code being configured, with the one or more processors, to cause the apparatus to perform at least receiving logging information associated with at least one of a handover failure or a radio link failure, the information identifying whether or not a user equipment was engaged in an exchange of at least one of data traffic or control traffic with a network at the time that the handover failure or radio link failure occurred, and in response to the received logging information, categorizing the handover failure or the radio link failure.

According to a further embodiment, the apparatus performs a grading or evaluation of the radio link failure, wherein the radio link failure is designated as a soft radio link failure in response to one or more of: a call re-establishment being successful, or the radio link failure occurring when there is no active exchange of at least one of data traffic or control traffic between the user equipment and the network. Thus, the soft radio link failure is used when the impact on user experience and the network is low or negligible. Alternatively or additionally, the user equipment may log or provide an indication as to whether or not there was an interruption during the exchange of at least one of data traffic or control traffic between the user equipment and the network, and/or how long the interruption was observed by the user equipment. Alternatively or additionally, the log or indication may contain information regarding the duration of the interruption even if the user equipment had not been engaged in an exchange of data traffic or control traffic with the network.

According to another embodiment, a non-transitory computer-readable storage medium carries one or more sequences of instructions which, when executed by one or more processors, cause an apparatus to perform at least logging information associated with at least one of a handover failure or a radio link failure, the information identifying whether or not a user equipment was engaged in an exchange of at least one of data traffic or control traffic with a network at the time that the handover failure or radio link failure occurred, storing the information in a non-transitory computer-readable medium, and reporting the information to the network. The information may be reported using a radio link failure or connection failure information signaling message.

According to another embodiment, a non-transitory computer-readable storage medium carries one or more sequences of instructions which, when executed by one or more processors, cause an apparatus to perform at least receiving logging information associated with at least one of a handover failure or a radio link failure, the information identifying whether or not a user equipment was engaged in an exchange of at least one of data traffic or control traffic with a network at the time that the handover failure or radio link failure occurred, and in response to the received logging information, categorizing the handover failure or the radio fink failure.

According to a further embodiment, the non-transitory computer-readable storage medium carries one or more sequences of instructions which, when executed by one or more processors, cause an apparatus to further perform a grading or evaluation of the radio link failure, wherein the radio link failure is designated as a soft radio link failure in response to one or more of: a call re-establishment being successful, or the radio link failure occurring when there is no active exchange of data traffic or control traffic between the user equipment and the network. Thus, the soft radio link failure is used when the impact on user experience and the network is low or negligible. Alternatively or additionally, the user equipment may log or provide an indication as to whether or not there was an interruption during the exchange of data traffic or control traffic between the user equipment and the network, and/or how long the interruption was observed by the user equipment. Alternatively or additionally, the log or indication may contain information regarding the duration of the interruption even if the user equipment had not been engaged in an exchange of data traffic or control traffic with the network. Additionally, the log may contain information about the transmission signal format used at the failure occurrence. The signal format information may specify one or more of a modulation and coding scheme, antenna configuration information, usage of coordinated multipoint transmission, or the like. Alternatively or additionally, the indication could also contain information on the traffic type (or QCI) that was interrupted/delayed due to RLF such that, for example, the RLF report may contain information with regard to one or more different traffic types that were interrupted/delayed.

In addition, for various exemplary embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various exemplary embodiments of the invention, the following is also applicable: a method comprising facilitating access to at least one interface configured to allow access to at least one service, the at least one service configured to perform any one or any combination of network or service provider methods (or processes) disclosed in this application.

For various exemplary embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various exemplary embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various exemplary embodiments, the methods (or processes) can be accomplished on the service provider side or on the mobile device side or in any shared way between service provider and mobile device with actions being performed on both sides.

Still other aspects, features, technical effects, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

DETAILED DESCRIPTION

Examples of methods, apparatuses, and computer program products for identifying handover failure modes are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
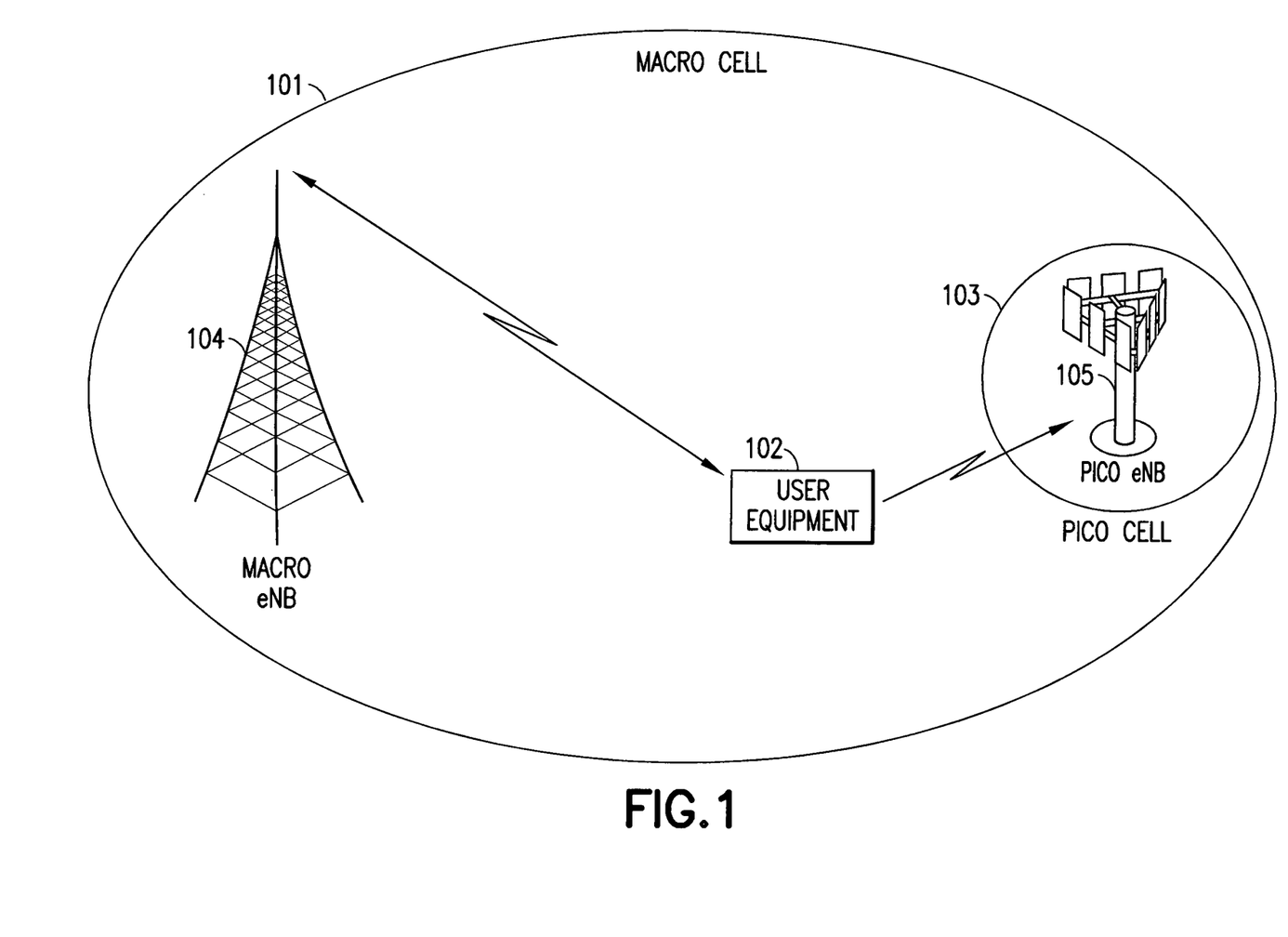
FIG. 1 is a hardware block diagram showing an illustrative Heterogeneous Network environment with a macro cell and a pico cell in accordance with a set of exemplary embodiments of the invention.

FIG. 1 is a hardware block diagram showing an illustrative Heterogeneous Network environment with a macro cell 101 and a pico cell 103 in accordance with a set of exemplary embodiments of the invention. A macro eNB 104 is associated with the macro cell 101. A pico eNB 105 is associated with the pico cell 103. In cellular networks, when a mobile device such as a user equipment (UE) 102 moves from cell to cell and performs cell selection/reselection and handover, the UE may measure the signal strength and/or the signal quality of one or more neighboring cells.

In accordance with a set of Long Term Evolution (LTE) embodiments, the UE 102 may measure two parameters that pertain to a reference signal: RSRP (Reference Signal Received Power) and RSRQ (Reference Signal Received Quality). In the HetNet environment illustrated in FIG. 1, the pico cell 103 has smaller coverage compared with the macro cell 101. In a given example, we have illustrated the case of a co-channel HetNet in which the pico cell 103 and the macro cell 101 utilize the same spectrum, the UE 102 would suffer interference from both the macro cell 101 and the pico cell 103. When the UE 102 is moving towards or leaving the pico cell 103 and the pico cell's RSRP or RSRQ is lower than a predefined value, the UE 102 may perform a handover (HO) procedure. This example should not be seen as a limiting factor, as other scenarios may be envisioned, for example an inter-frequency type of HetNet scenario or different RATs.

In situations where the RSRP or RSRQ (or signal quality in general) from the pica cell 103 varies dramatically as a function of time and/or as a function of the position of the UE 102, the target cell for handover, mainly the pico cell 103, is not always reliable. A typical example of this situation is when the UE 102 is moving towards the pico cell 103 tangentially or is leaving the pico cell 103. Under these circumstances, the UE 102 may suffer a higher connection drop probability if the UE 102 performs a handover procedure and hands over to the pico cell 103. On the other hand, if pico-cell attaching is forbidden for the UE 102 moving towards the pico cell 103, a high connection drop probability may also result.

Figure 2:
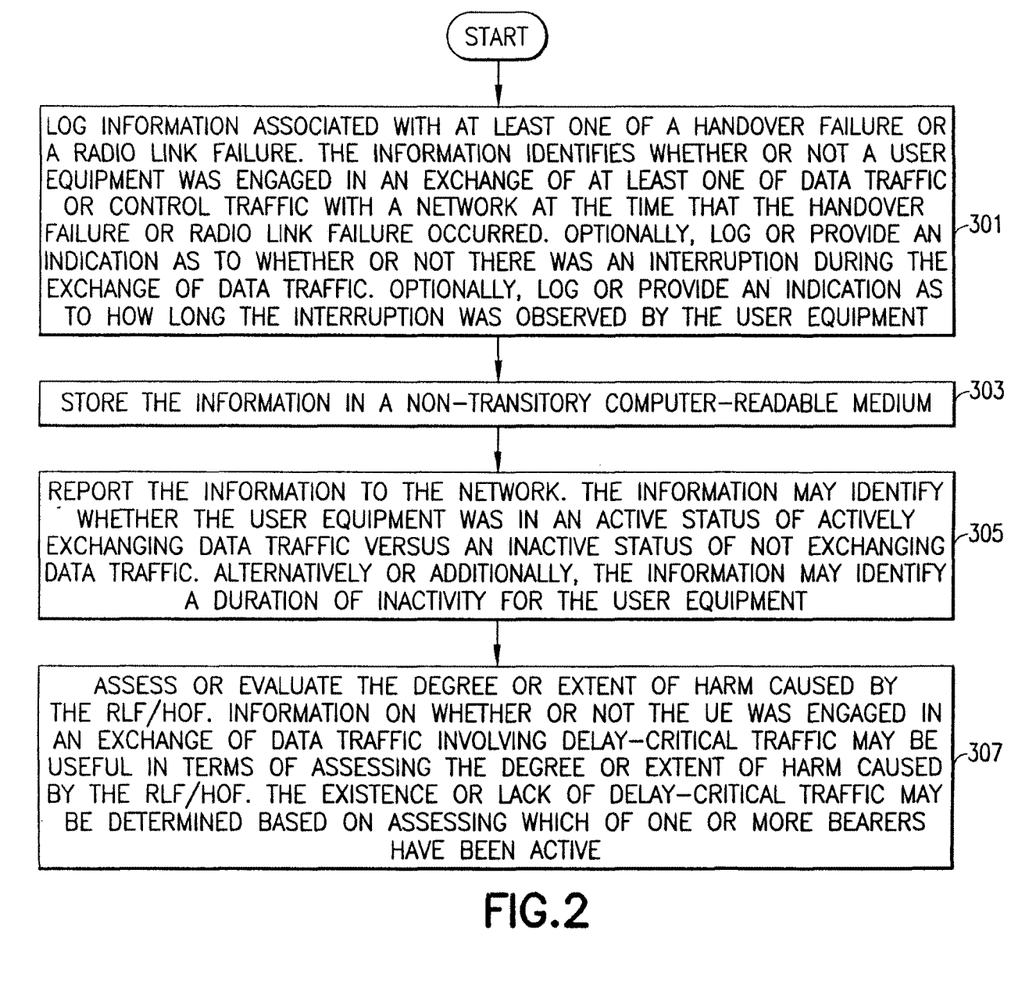
FIG. 2 is a flowchart showing a first illustrative method for identifying handover failure modes in accordance with a set of exemplary embodiments of the invention.

FIG. 2 is a flowchart showing a first illustrative method for identifying handover failure modes in accordance with a set of exemplary embodiments of the invention. The operational sequence commences at block 301 where information associated with at least one of a handover failure or a radio link failure is logged. The information identifies whether or not a user equipment was engaged in an exchange of at least one of data traffic or control traffic with a network at the time that the handover failure or radio link failure occurred. The exchanging of at least one of data traffic or control traffic with the network means that data traffic may be exchanged with the network without any exchange of control traffic, or control traffic may be exchanged with the network without any exchange of data traffic, or both control and data traffic may be exchanged with the network.

Optionally, block 301 may further comprise the user equipment logging or providing an indication as to whether or not an exchange of at least one of data traffic or control traffic was interrupted between the user equipment and the network, and/or how long the interruption was observed by the user equipment. The log or indication may, but need not, contain information regarding the duration of the interruption even if the user equipment had not been engaged in an exchange of data traffic with the network.

When logging information of a handover failure or radio link failure, UE 102 (FIG. 1) may store information about whether or not the UE was engaged in active traffic at the time that a failure such as an RLF has occurred. The UE 102 may include this information in the radio link failure (or connection failure) information it reports to the NW. The NW may then use this information to categorize HOF/RLF events into different classes depending on how harmful the events were (for example, did the event affect user experience or not).

Pursuant to an exemplary embodiment, an additional or alternative proposal is to introduce a grading of the RLFs/HOFs by introducing the concept of a 'soft' RLF. A soft RLF may be used, for example, when a call re-establishment is successful, or when an RLF/HOF occurs when there is no active data or control transmission exchange taking place between the UE and the NW. A soft RLF is used when the impact on user experience is low or negligible. In another exemplary embodiment, alternatively and/or additionally, the UE 102 may log/indicate whether there was any interruption and/or how long interruption or outage was observed by the UE (measured, for example, in milliseconds). Additionally the report may contain information of the duration of interruption even if UE had no data. Yet another additional type of information may, but need not, be employed. The report may contain information about the transmission signal format being used at the time of failure. In addition to the information about the discontinuous reception, the information about transmission signal format would indicate whether the failure was influenced by the signal format sent from the source or target cells. The signal format may be one of the modulation and coding scheme, antenna configuration, usage of coordinated multipoint transmission, or the like.

Pursuant to an exemplary embodiment, the RLF or HOF or other link quality related event is considered to be of less severity (or, for example, considered to be a 'soft RLF' or counted with a lower weight in KPI) if the link that failed or the link that experiences low quality is served by a cell in a Secondary eNB (SeNB) when the UE is dual connected and has a Primary cell in Master eNB (MeNB). Furthermore, there may different categories (or degrees of severity of the problem/failure) for a cell that is carrying PUCCH (physical uplink control channel) in SeNB and other cells in SeNB. These degrees of severity may be included in the reporting from UE to the network or they may be taken into account by the network (e.g. in mobility robustness optimization or network KPIs) based on information reported by the UE and/or based on information collected by the network.

Next, at block 303, the information is stored in a non-transitory computer-readable medium. At block 305, the information is reported to the network. Blocks 303 and 305 may be performed contemporaneously or in any order. The information reported to the network at block 305 illustratively identifies whether a UE is in active status versus inactive status, and/or identifies a duration of inactivity for the UE. This information may be included in a radio link failure message or a connection failure information signaling message. This information may, but need not, be signaled over an via an open interface, e.g. X2 interface from a first eNB to which the UE was previously connected to a new source eNB. The open interface, e.g. X2 interface may be employed if the first eNB is different from the current eNB as, for example, after the UE has re-established RRC connection to a second eNB. A determination of whether or not the UE was engaged in at least one of active data traffic or active control traffic may be performed by performing one or more of: determining a discontinuous reception state; determining a length of time that has elapsed since the user equipment has transmitted or received user data; or monitoring a buffer status.

At block 307, the degree or extent of harm caused by the RLF/HOF is evaluated or assessed. Information on whether or not the UE was engaged in an exchange of data involving delay-critical traffic may be useful in terms of assessing the degree or extent of harm caused by the RLF/HOF. The existence or lack of delay-critical traffic may be determined based on assessing which of one or more bearers have been active (e.g. voice vs. web browsing or background traffic). Also, for instance, signaling radio bearer (SRB) could be considered to carry important control information. Also, for example the duration of the interruption may be considered as one criterion for assessing the degree or extent of the harm caused by the RLF/HOF.

As an example, if the UE has sent power preference indication (PPI) assistance information (for example if the UE 102 may have the capability of sending UEAssistanceInformation), this may be indicated in the RLF information reporting of block 305. For example, the UE may be configured for sending a power preference indication denoted as powerPrefIndication-r11. If PPI is set to lowPowerConsumption preference (i.e. if powerPrefIndication-r11 is set to lowPowerConsumption), then the RLF may be marked as not delay critical and therefore marked as a 'non-critical RLF', and/or not counted as an RLF. On the other hand, if PPI is set to normal (i.e. powerPrefIndication-r11 is set to normal), then the RLF may be marked as delay critical and therefore marked as a 'critical' RLF and considered important, and thus counted as an RLF. In these cases, information of the UE's PPI preference may be included in an RLF report in the information reported at block 305.

In situations where the UE is not configured for implementing PPI, another mechanism may be employed in order to determine whether the RLF is an 'important' RLF or an 'unimportant' RLF. Based on a determination of which of one or more bearers are scheduled (each QoS has TFT/priority), the RLF may be categorized. For example, if a voice call is interrupted, this is considered to be more severe than if a web browsing action is interrupted.

Figure 3:
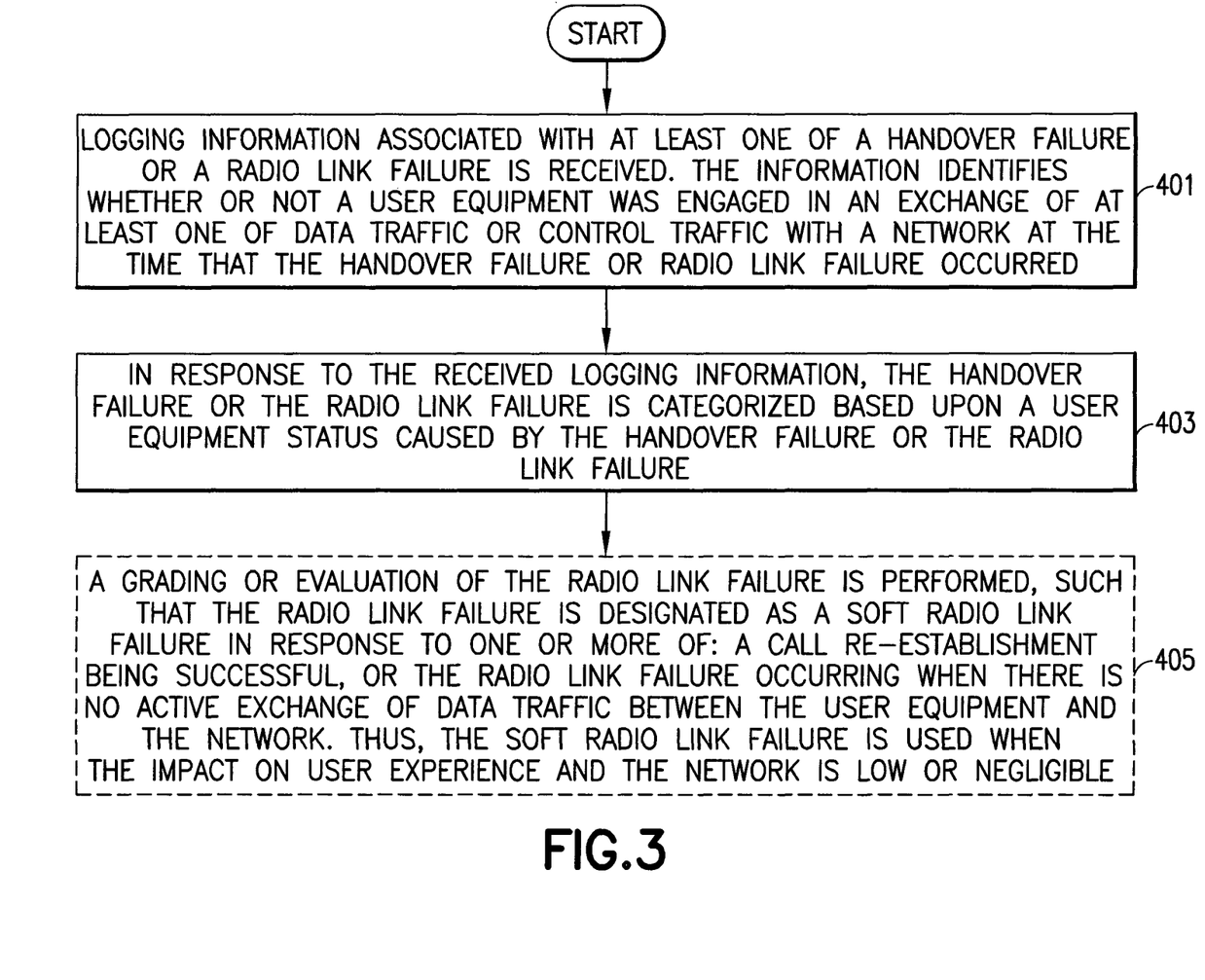
FIG. 3 is a flowchart showing a second illustrative method for identifying handover failure modes in accordance with a set of exemplary embodiments of the invention.

FIG. 3 is a flowchart showing a second illustrative method for identifying handover failure modes in accordance with a set of exemplary embodiments of the invention. The operational sequence commences at block 401 where logging information associated with at least one of a handover failure or a radio link failure is received. The information identifies whether or not a user equipment was engaged in an exchange of at least one of data traffic or control traffic with a network at the time that the handover failure or radio link failure occurred. The exchanging of at least one of data traffic or control traffic with the network means that data traffic may be exchanged with the network without any exchange of control traffic, or control traffic may be exchanged with the network without any exchange of data traffic, or both control and data traffic may be exchanged with the network.

Next, at block 403, in response to the received logging information, the handover failure or the radio link failure is categorized based upon a user equipment status caused by the handover failure or the radio link failure.

Optionally, the operational sequence of FIG. 3 may progress to block 405 where a grading or evaluation of the radio link failure is performed, such that the radio link failure is designated as a soft radio link failure in response to one or more of: a call re-establishment being successful, or the radio link failure occurring when there is no active exchange of data traffic between the user equipment and the network. Thus, the soft radio link failure is used when the impact on user experience and the network is low or negligible.

Alternatively or additionally, in the case of RLF, if the call re-establishment is successfully completed and UE had been engaged in an active exchange of data traffic prior to the re-establishment, then the RLF may not be counted to an RLF counter or the RLF may be counted as a 'soft RLF'. Likewise, in the case of RLF, if the call re-establishment is not successfully completed and the UE had been engaged in an active exchange of data traffic prior to the RLF, then the RLF may be used to increment the RLF counter. If the UE was not engaged in an active exchange of data traffic prior to the RLF, then the RLF may not be counted or the RLF could be counted as a 'soft RLF'. Similarly, if the UE was engaged in an active exchange of data traffic prior to the RLF and the re-establishment is not successful, then the RLF counter is incremented.

In some exemplary embodiments, the classification or counting of a RLF (or other failure event such as a HOF) as a 'soft RLF' or using some other grading to possibly more categories (e.g. depending on the type and/or requirements of the traffic that was interrupted; e.g. interruption of voice call could be considered more severe than background traffic or web browsing) may be done by the network based at least in part on the information obtained from the UE.

Figure 4:
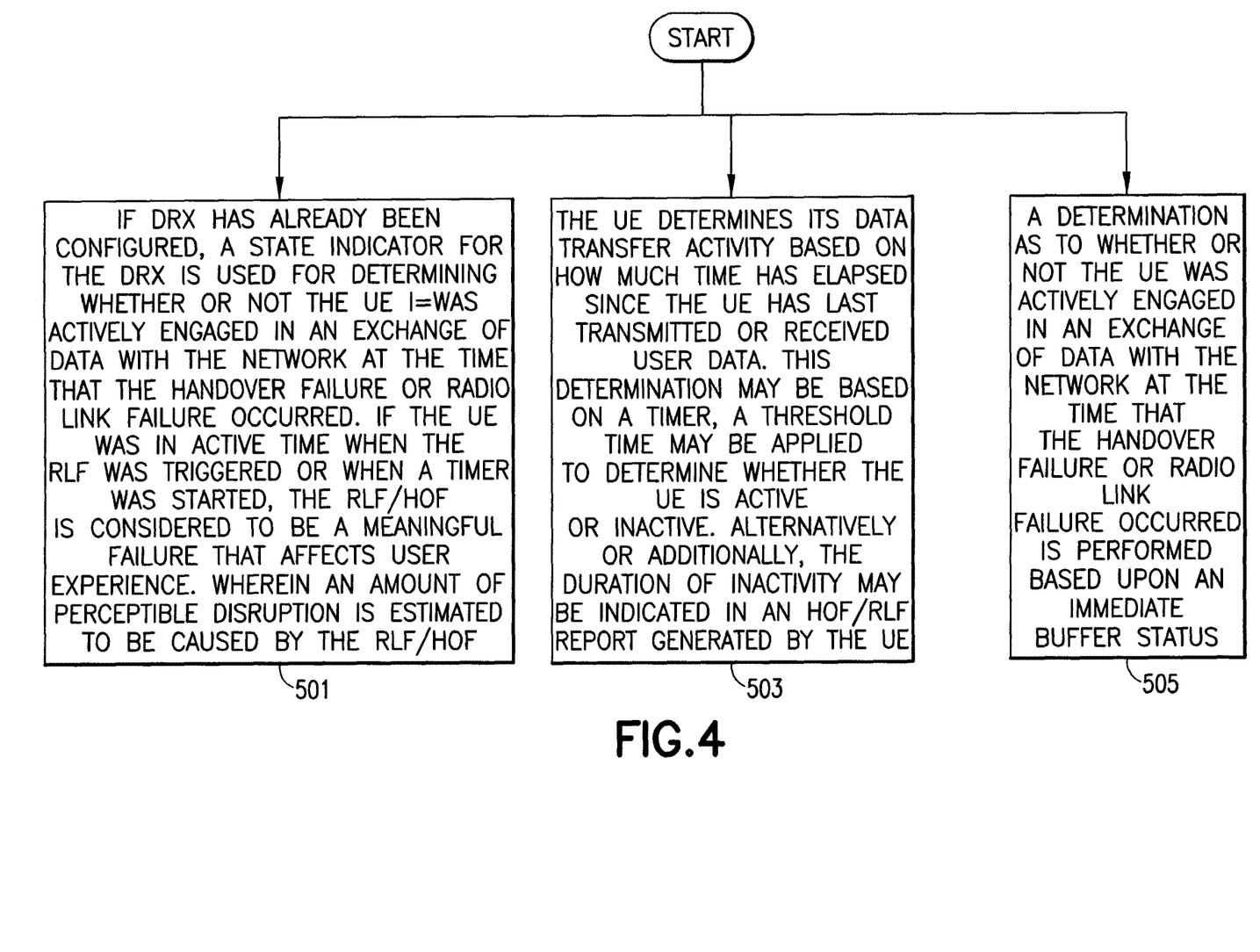
FIG. 4 is a flowchart showing an illustrative method for determining whether or not a user equipment was engaged in an exchange of data with a network at the time that a handover failure or radio link failure occurred.

FIG. 4 is a flowchart showing an illustrative method for determining whether or not a user equipment was engaged in an exchange of data with a network at the time that the handover failure or radio link failure occurred. Thus, the operational sequence of FIG. 4 may be employed, for example, to perform the procedure that was previously described in connection with block 301 of FIG. 2. The method of FIG. 4 commences at any of blocks 501, 503, or 505. One or more of blocks 501, 503, and 505 are performed. If more than one of these blocks 501, 503, 505 is performed, the blocks may be performed contemporaneously or in any order.

At block 501, if DRX has already been configured, DRX state may be used for determining whether or not the UE 102 (FIG. 1) was actively engaged in an exchange of data with the network at the time that the handover failure or radio link failure occurred. If the UE was in Active Time when the RLF was triggered or when a timer was started (or for example, or alternatively when a timer T310 is started), the RLF/HOF is considered to be a meaningful failure. It should be noted that T310 is not a reference numeral shown in the drawings, but rather is used to designate a certain type of timer known to those skilled in the relevant art. A meaningful failure is a failure that affects user experience, wherein an amount of perceptible disruption is estimated to be caused by the RLF/HOF. Likewise, if the UE has a Short DRX cycle timer running, the failure could be considered to have happened when the UE was active.

Pursuant to another exemplary embodiment, the state information and possible inactivity times before the connection failures may be used to inform the network in order for the network to be able to make accurate or reasonable conclusions about mobility issues.

Block 503 (FIG. 4) may be performed as an alternative or addition to block 501. At block 503, the UE 102 (FIG. 1) may determine its data transfer activity based on how much time has elapsed since the UE has last transmitted or received user data. This may be counted, for example, as time elapsed since the latest on-duration or expiry of the inactivity timer. This determination may be based on a timer, such as an inactivity timer that UE may have running. A threshold may be applied to determine whether the UE is active or inactive. Alternatively or additionally, the duration of inactivity may be indicated in an HOF/RLF report generated by the UE.

Block 505 (FIG. 4) may be performed as an alternative or addition to block 501 and/or block 503. At block 505, a determination as to whether or not the UE 102 (FIG. 1) was actively engaged in an exchange of data with the network at the time that the handover failure or radio link failure occurred is performed based upon an immediate buffer status. For example, in an uplink (UL) direction, the UE knows whether or not it has something to transmit, such as whether a MAC/Radio Link Control (RLC)/Packet Data Convergence Protocol (PDCP) or similar buffer is empty or not, or whether a pending UL HARQ (re-) transmission exists. Similarly, in a downlink (DL) direction, the NW may determine whether or not the UE had data in the buffer, or any pending DL HARQ re-transmissions, or was active within the last N seconds, wherein N may be a threshold value that may be, for example, one second or two seconds or some other value. The threshold may be compared to the length of time that the UE has been inactive. Based on this length, the UE includes an indication (e.g. one bit) to the RLF (or e.g. handover failure) report that the UE sends to the network. The threshold value may be configured by the network and signaled to the UE, or it may be a value that is known by the UE or known by the network only. The signaling may comprise (for example, a one bit) indication that would be indicative of whether the UE was active (or inactive, or had some pending user data that was delayed due to radio link failure) at the time associated with the radio link failure (e.g. when the T310 timer was started, or the T310 timer expired or when the connection was re-established or established again, or in-between these start and expiration times).

Based on this indication from the UE (or by obtaining similar information from the network) the network may categorize a radio link failure or a handover failure as important or unimportant or to some degree of severity, for example, based on how long the user data was subjected to an interruption or a delay. Traffic type may be also considered when assessing how severe the failure was, for example, so that interruption or delay of voice or other real-time service may be considered more severe, for example, than web browsing.

Figure 5:
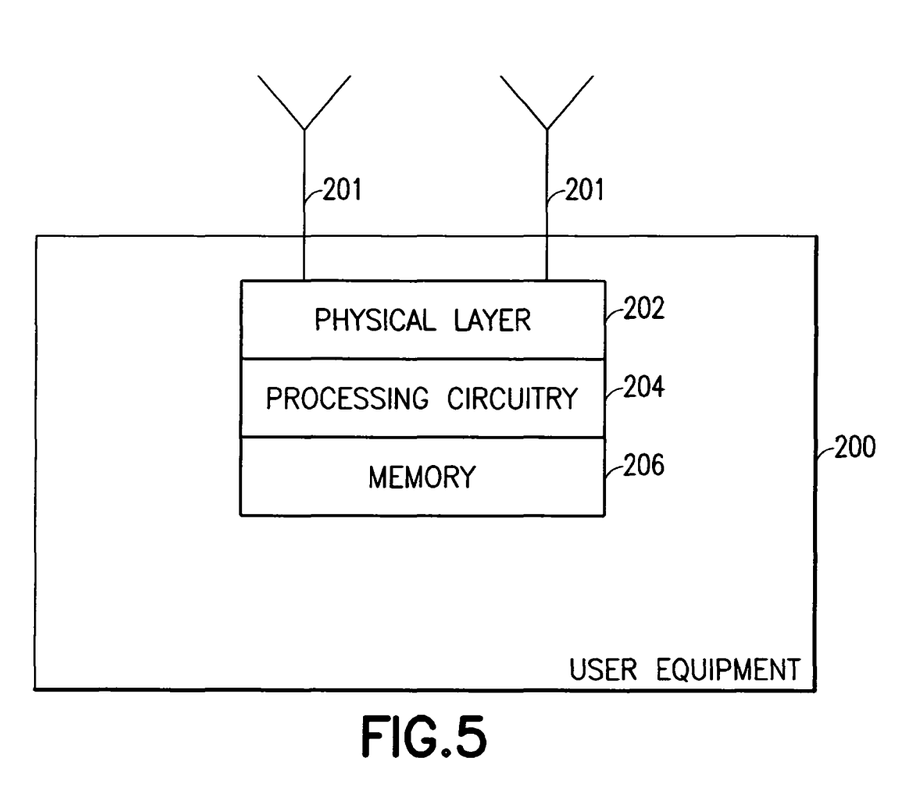
FIG. 5 is a hardware block diagram showing an illustrative user equipment in accordance with a set of exemplary embodiments of the invention.

PG. 5 is a hardware block diagram showing an illustrative user equipment in accordance with a set of exemplary embodiments of the invention. A UE 200 may be suitable for use as the UE 102 described previously with respect to FIG. 1. The UE 200 (FIG. 5) may include physical layer circuitry 202 for transmitting and receiving signals to and from eNBs, such as macro eNB 104 and pico eNB 105 (FIG. 1), using one or more antennas 201 (FIG. 5). The UE 200 may also include processing circuitry 204 that may include, among other things a channel estimator. The UE 200 may also include a memory 206. The processing circuitry 204 may be configured for performing any of the methods described hereinafter with reference to FIGS. 2-4, and may also be configured for gathering information for transmission to an eNB. The processing circuitry 204 may, but need not, include a media access control (MAC) layer.

The various processors, memories, programs, transceivers and antennas depicted in FIG. 5 may all be considered to represent means for performing operations and functions that implement the several non-limiting aspects and embodiments of the invention. The computer-readable memory 206 may be of any type suitable to the local technical environment and may be implemented using any suitable data storage technology, such as semiconductor-based memory devices, random access memory, read only memory, programmable read only memory, flash memory, magnetic memory devices and systems, optical memory devices and systems, fixed memory and removable memory. The processing circuitry 204 may be of any type suitable to the local technical environment, and may comprise one or more of general purpose computers, special purpose computers, microprocessors, digital signal processors (DSPs), and processors based on multi-core processor architectures, as non-limiting examples.

Illustratively, the UE 200 (FIG. 5) may include one or more of a keyboard, a display, a non-volatile memory port, multiple antennas, a graphics processor, an application processor, speakers, and other mobile device elements. The display may, but need not, be implemented using a liquid crystal display (LCD), a plasma screen, or a light-emitting diode (LED) screen that may include a touch screen. The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. Some embodiments may utilize two or more antennas, or a single antenna with multiple apertures may be used. In these multiple aperture embodiments, each aperture may be considered a separate antenna. In some multiple-input multiple-output (MIMO) embodiments, the antennas 201 may be effectively separated to take advantage of spatial diversity and the different channel characteristics that may result between each of antennas 201 and the antennas of a transmitting station. In some MIMO embodiments, the antennas may be separated by up to $1/10$ of a wavelength or more.

Although the UE 200 is illustrated as having several separate functional elements, one or more of the functional elements may be combined and may be implemented by combinations of software-configured elements, such as processing elements including digital signal processors (DSPs) and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Any of the embodiments described herein may be implemented in one or a combination of hardware, firmware and software. Embodiments may also be implemented as instructions stored on a non-transitory computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors of the UE 200 may be configured with the instructions to perform the operations described herein.

Illustratively, the UE 200 may, but need not, be configured to receive orthogonal frequency division multiplexed (OFDM) communication signals over a multicarrier communication channel. The OFDM signals may comprise a plurality of orthogonal subcarriers. In some broadband multicarrier embodiments, eNBs (including at least one of the macro eNB 104 or the pico eNB 105, see FIG. 1) may be part of a broadband wireless access (BWA) communication network, such as a Worldwide Interoperability for Microwave Access (WiMAX) communication network or a 3rd Generation Partnership Project (3 GPP) Universal Terrestrial Radio Access Network (UTRAN) LTE communication network, although the scope of the invention is not limited in this respect. Likewise, the macro eNB 104 may be configured to implement first RAT such as UTRAN LTE, and the pico eNB 105 may be configured to implement a second RAT such as WiMAX. In any of these broadband multicarrier embodiments, the UE 200 (FIG. 5) and the eNBs may be configured to communicate in accordance with an orthogonal frequency division multiple access (OFDMA) technique.

Alternatively or additionally, the UE 200 and the eNBs may be configured to communicate signals that were transmitted using one or more modulation techniques such as spread spectrum modulation (including, for example, direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

The UE 200 may, but need not, be implemented in the form of all or part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

Pursuant to some LTE embodiments, the UE 200 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). Using the CQI, the transmitter selects one of several modulation alphabets and code rate combinations. The RI informs the transmitter about the number of useful transmission layers for the current MIMO channel, and the PMI indicates the codebook index of the preceding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

The CQI may, but need not, be an indication of the downlink mobile radio channel quality as experienced by the UE 200. The CQI allows the UE 200 to propose to an eNB an optimum modulation scheme and coding rate to use for a given radio link quality so that the resulting transport block error rate will not exceed a certain value, such as 10%. In some embodiments, the UE 200 may report a wideband CQI value which refers to the channel quality of the system bandwidth. The UE 200 may also report a sub-band CQI value per sub-band of a certain number of resource blocks which may be configured by higher layers. The full set of sub-bands may cover the system bandwidth. In case of spatial multiplexing, a CQI per code word may be reported.

The PMI may indicate an optimum precoding matrix to be used by the eNB for a given radio condition. The PMI value refers to a codebook table. The network configures the number of resource blocks that are represented by a PMI report. To cover the system or network bandwidth, multiple PMI reports may be provided. PMI reports may also be provided for closed loop spatial multiplexing, multi-user MIMO and closed-loop rank 1 precoding MIMO modes.

Pursuant to some LTE embodiments, a basic unit for wireless resource is a Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol. At least two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

Optionally, the UE 200 may, but need not, be configured for a cooperating multipoint (CoMP) mode wherein the network may be configured for joint transmissions to the UE in which two or more cooperating/coordinating points, such as remote-radio heads (RRHs) transmit jointly. The joint transmissions may be MIMO transmissions and the cooperating points may be configured to perform joint beamforming.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   logging, by a user equipment, information associated with at least one of a handover failure or a radio link failure, the information comprising an indication that the user equipment was engaged in an exchange of at least one of a data traffic or a control traffic with a network when the handover failure or the radio link failure occurred, and the information including information on a traffic type being exchanged when the handover failure or the radio link failure occurred;
   storing, by the user equipment, the information in a non-transitory computer-readable medium; and
   reporting, by the user equipment, the information to the network.

2. The method of claim 1, wherein the information is included in a radio link failure or connection failure information signaling message, and wherein the user equipment determines that the user equipment was engaged in the exchange of at least one of the data traffic or the control traffic by at least determining a discontinuous reception state, a length of time that has elapsed since the user equipment has transmitted or received user data, and/or a buffer status.

3. The method of claim 1, wherein the logging further comprises logging an indication as to one or more of: a length of time that an interruption in the exchange of at least one of the data traffic or the control traffic was observed at the user equipment, or that there was an interruption during the exchange of data between the user equipment and the network.

4. The method of claim 1, wherein the traffic type comprises at least one of a voice traffic type and a web browsing traffic type.

5. An apparatus comprising one or more processors and one or more memories including computer program code, the one or more memories and the computer program code being configured, with the one or more processors, to cause the apparatus to at least:
   log information associated with at least one of a handover failure or a radio link failure, the information comprising an indication that the user equipment was engaged in an exchange of at least one of a data traffic or a control traffic with a network when the handover failure or the radio link failure occurred, and the information including information on a traffic type being exchanged when the handover failure or the radio link failure occurred;
   store the information in a non-transitory computer-readable medium; and
   report the information to the network.

6. The apparatus of claim 5, wherein the information is included in a radio link failure or connection failure information signaling message, the apparatus further caused to at least perform a determination that the apparatus was engaged in the exchange of at least one of the data traffic or the control traffic by at least determining a discontinuous reception state, a length of time that has elapsed since the apparatus has transmitted or received user data, and/or a buffer status.

7. The apparatus of claim 5, wherein the logged information further comprises an indication as to one or more of: a length of time that an interruption in the exchange of at least one of the data traffic or the control traffic was observed at the apparatus, or that there was an interruption during the exchange of data between the apparatus and the network.

8. The apparatus of claim 5, wherein the traffic type comprises at least one of a voice traffic type and a web browsing traffic type.

9. The apparatus of claim 5, wherein the apparatus comprises, or is comprised in, a user equipment, the apparatus further comprising:
   user interface circuitry and user interface software configured to at least facilitate user control of at least some functions of the user equipment through use of a display and configured to respond to user input; and a display and display circuitry configured to at least display at least a portion of a user interface of the user equipment, the display and display circuitry configured to at least facilitate user control of at least some functions of the user equipment.

10. An apparatus comprising one or more processors and one or more memories including computer program code, the one or more memories and the computer program code being configured, with the one or more processors, to cause the apparatus to at least:

receive, from a user equipment, information associated with at least one of a handover failure or a radio link failure at the user equipment, the information comprising an indication that the user equipment was engaged in an exchange of at least one of a data traffic or a control traffic with a network when the handover failure or the radio link failure occurred, and the information including information on a traffic type being exchanged when the handover failure or the radio link failure occurred; and in response to receiving the information, categorize, based at least on the information, the handover failure or the radio link failure in accordance with a severity of the handover failure or the radio link failure.

11. The apparatus of claim 10, wherein the apparatus is further caused to at least perform a grading and/or an evaluation of the radio link failure, and wherein the radio link failure is designated as a soft radio link failure in response to a call re-establishment procedure being successful.

12. The apparatus of claim 10, wherein the apparatus is further caused to at least perform a grading and/or an evaluation of the radio link failure, and wherein the radio link failure is designated as a soft radio link failure in response to the radio link failure occurring when there is no active exchange of data between the user equipment and the network.

13. The apparatus of claim 10, wherein the apparatus is at least one of an eNB or a base station, and wherein the traffic type comprises at least one of a voice traffic type and a web browsing traffic type.

* * * * *